United States Patent [19]
Inoue et al.

[11] Patent Number: 5,857,696
[45] Date of Patent: Jan. 12, 1999

[54] AIR BAG OF AIR BAG DEVICE

[75] Inventors: Michio Inoue, Kagamigahara; Mariko Nakashima, Inazawa, both of Japan

[73] Assignee: Toyoda Gosei Co., Ltd., Aichi-ken, Japan

[21] Appl. No.: 778,221

[22] Filed: Jan. 8, 1997

[30] Foreign Application Priority Data

Jan. 10, 1996 [JP] Japan ................................. 8-002594

[51] Int. Cl.⁶ .......................... B60R 21/16; B60R 21/20
[52] U.S. Cl. .................................. 280/728.2; 280/743.1
[58] Field of Search ........................... 280/743.1, 728.1, 280/730.2, 732, 730.1, 728.2

[56] References Cited

U.S. PATENT DOCUMENTS

| | | | |
|---|---|---|---|
| 3,807,754 | 4/1974 | Rodenbach et al. | 280/743.1 |
| 4,006,918 | 2/1977 | MacFarland | 280/743.1 |
| 4,153,273 | 5/1979 | Risko | 280/732 |
| 5,062,664 | 11/1991 | Bishop et al. | 280/732 |
| 5,094,475 | 3/1992 | Olsson et al. | 280/730.2 |
| 5,114,180 | 5/1992 | Kami et al. | 280/743.1 |
| 5,586,782 | 12/1996 | Zimmerman, II et al. | 280/743.1 |
| 5,664,805 | 9/1997 | Yoshida et al. | 280/743.1 |

FOREIGN PATENT DOCUMENTS

| | | | |
|---|---|---|---|
| 6-87393 | 3/1994 | Japan | 280/743.1 |

*Primary Examiner*—Peter C. English
*Attorney, Agent, or Firm*—Intellectual Property Group of Pillsbury Madison & Sutro LLP

[57] ABSTRACT

An air bag is made by forming a base cloth into the shape of a bag by stitching. The air bag is expanded by gas supplied from an inflator. Stitching of areas of the base cloth in the vicinity of the inflator is made non-extendable stitching, and stitching of areas of the base cloth distant from the inflator is made extendable stitching. As a result, even if the output of the inflator is high, gas leakage in the vicinity of the inflator can be prevented. Also, even if the output of the inflator is high, it is possible to suppress damage suffered by stitching thread in areas of stitching in the vicinity of the inflator.

9 Claims, 10 Drawing Sheets

AIR BAG OF AIR BAG DEVICE

BACKGROUND OF THE INVENTION (1). Field of the Invention

This invention relates to an air bag of an air bag device. The air bag device is installed for example in a door, an instrument panel, a seat or a steering wheel of a car.

(2). Description of the Prior Art

Conventionally, the air bag of an air bag device has been made by forming a base cloth, of a predetermined shape, into the shape of a bag by stitching.

Gas supplied from an inflator flows rapidly into the air bag and the air bag expands. When the air bag finishes expanding, large tensile forces act on the base cloth. For this reason, conventionally, stitching of the air bag has been carried out with extendable chain stitching in order to moderate the existing tensile forces when the air bag finishes expanding.

However, when all the stitching of the air bag is made extendable chain stitching, the problem has arisen that when a high output inflator is used in the air bag device, the gas supplied from the inflator is at a higher temperature and at a higher pressure consequently, at stitched areas of the air bag, such as in the vicinity of the inflator, there is a risk of gas leaking from between stitched portions of the base cloth thereby damaging the stitching thread.

SUMMARY OF THE INVENTION

Accordingly, an object of the invention is to solve this problem and provide an air bag for an air bag device which prevents gas leakage in the vicinity of the inflator even if the output of the inflator is high and to thereby eliminate damage that might otherwise be suffered by the stitching thread in the vicinity of the inflator.

This and other objects of the invention can be achieved by an air bag made by forming a base cloth into the shape of a bag and stitching the base cloth using non-extendable stitching in the vicinity of the inflator with extendable stitching in areas distant from the inflator.

An example of non-extendable stitching is lock stitching, and an example of extendable stitching is chain stitching.

In an air bag according to the invention, in areas of stitching in the vicinity of the inflator the base cloth is stitched non-extendably. As a result, when the air bag expands, portions of the base cloth stitched together in the vicinity of the inflator do not part. Consequently, gas leakage is prevented even if the inflator output is high.

Also, because portions of the base cloth stitched together in the vicinity of the inflator do not part, even if the output of the inflator is high, the stitching thread in such areas will not readily come into contact with the gas. As a result, it is possible to eliminate stitching thread damage caused by the gas in the vicinity of the inflator.

In areas of stitching distant from the inflator, the base cloth is stitched extendably. As a result, it is possible to accommodate moderately large tensile forces that act on the base cloth when the air bag finishes the expanding process.

Therefore, with an air bag constructed according to the invention, even if the output of the inflator is high, it is possible to prevent gas leakage in areas in the vicinity of the inflator. Likewise, it is also possible to eliminate damage suffered by stitching thread in the vicinity of the inflator. Further, it is possible to tolerate moderately large tensile forces acting on the base cloth as the air bag finishes its expansion.

The invention also provides an air bag that can be assembled using pressing members having a cylinder type inflator and a cylindrical diffuser covering the inflator. The air bag is made up of a greatly expandable baglike main body part, a connecting part provided at an end of the main body part, and a substantially cylindrical insertion part connected to the connecting part. The cylindrical insertion part has both ends open for receiving an inserted diffuser covering the inflator and both ends can be attached to the diffuser using pressing members. The connecting part is formed so as to be constricted from both ends of the insertion part. Stitching of the main body part, of the insertion part and of the connecting part in the vicinity of the inflator is undertaken using non-extendable stitching. Stitching in areas of the main body part that are distant from the inflator uses extendable stitching.

With this kind of air bag construction, in addition to the actions and effects described above, the following actions and effects can be obtained.

When the air bag is attached to the diffuser, the cylindrical diffuser is inserted into the insertion part and the ends of the insertion part are attached to the diffuser using pressing members. At this time, due to the constriction of the connecting part, the ends of the insertion part can be easily seen from outside. Consequently, positioning of the diffuser and fitting of the pressing members can be carried out easily. As a result, the work of fitting the air bag is easy and the air bag device is easily and correctly assembly.

Other objects, features, and characteristics of the invention will become apparent upon consideration of the following description and the appended claims with reference to the accompany drawings, all of which form a part of this specification and wherein like reference numerals represent corresponding parts in the various views.

BRIEF DESCRIPTION OF THE DRAWINGS

FIG. 6b is a cross-sectional view taken along lines 6b—6b in FIG. 6a;

DETAILED DESCRIPTION OF THE PREFERRED EMBODIMENTS

The invention will now be described in view of the preferred embodiments as shown in the accompanying drawings. However, the invention is not limited to these preferred embodiments, and any changes within the elements of the claims, or features equivalent to those elements, are included in the scope of the claims.

An air bag device M1, in which is used an air bag 1 of a first preferred embodiment of the invention, is for installation in a door of a car.

Figure 1:
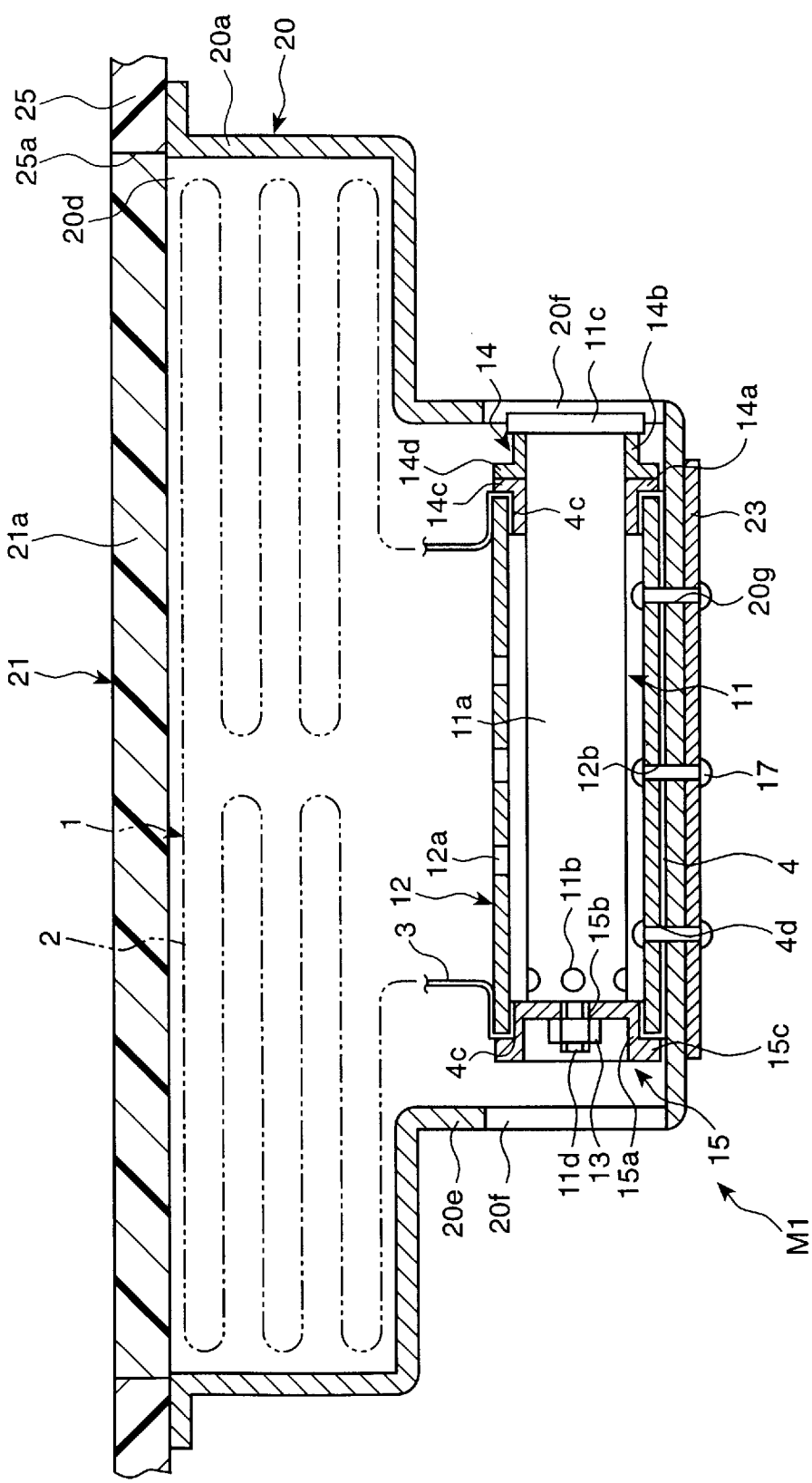
FIG. 1 is a sectional view of an air bag device in which an air bag of a first preferred embodiment of the invention is used.
Figure 2:
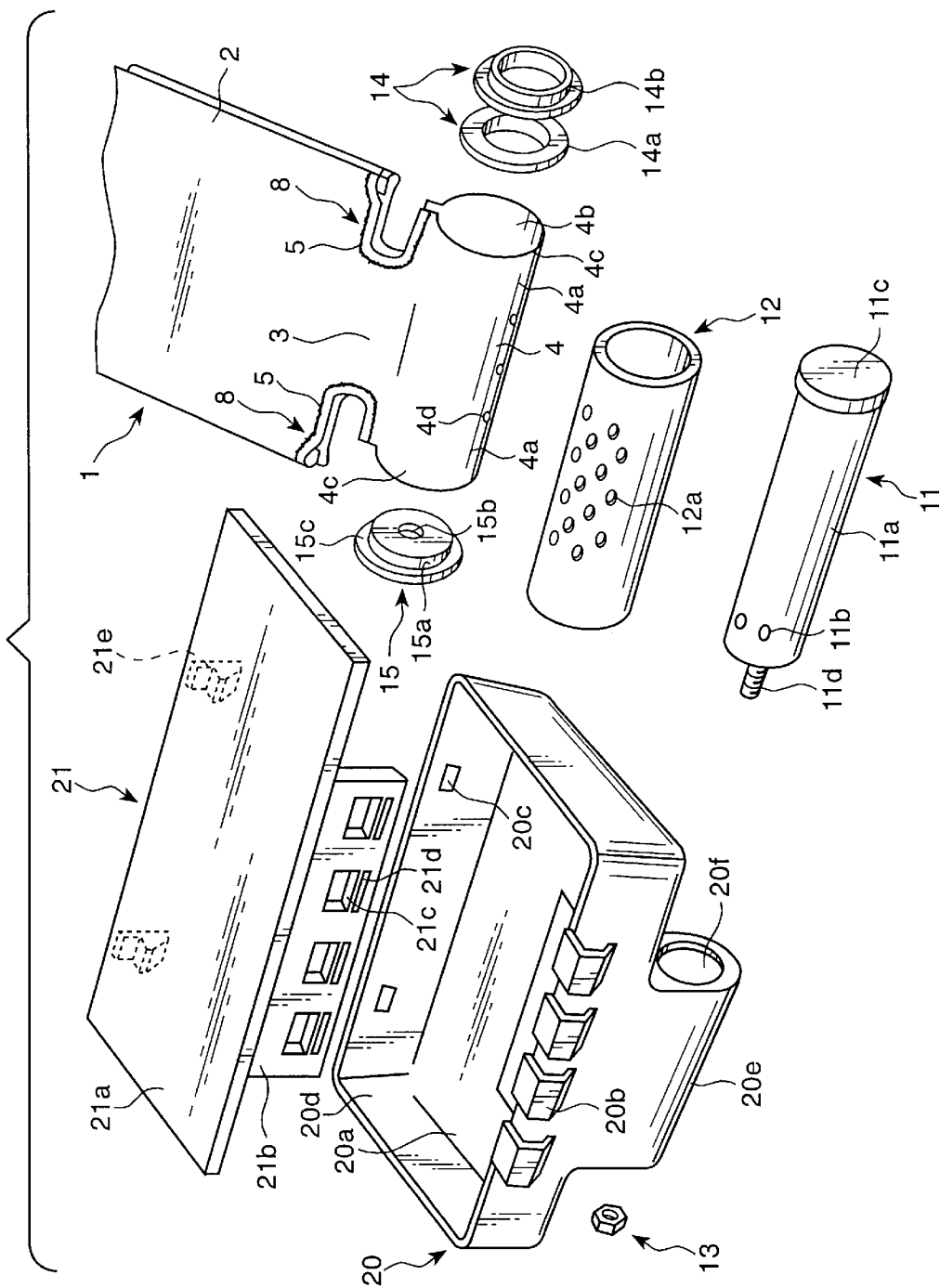
FIG. 2 is an exploded perspective view of the same air bag device.

As shown in FIGS. 1 and 2, besides the air bag 1, the air bag device M1 comprises an inflator 11, a diffuser 12, a case 20 and a cover 21. The inflator 11 supplies gas for expansion of the air bag 1. The diffuser 12 is preferably cylindrical and covers the inflator 11 so as to diffuse gas generated by the inflator 11. The case 20 houses the folded air bag 1, the inflator 11 and the diffuser 12. The cover 21 covers an opening 20d within case 20.

The air bag 1 is made up of a main body part 2, a connecting part 3 and an insertion part 4. The main body part 2 is the portion which will greatly expand into the form of a bag shaped roughly like an rectangular parallelopiped. The connecting part 3 connects an inner end of the main body part 2 to the insertion part 4. The insertion part 4 is substantially cylindrical in shape and has both its ends open to slidingly receive the inflator 11 and the diffuser 12 which will be inserted therethrough. The connecting part 3 is formed to be constricted inwardly from the ends of the insertion part 4.

The internal diameter of the end openings 4b in attachment portions 4a of the left and right ends of the insertion part 4 is roughly equal to the external diameter of the cylindrical diffuser 12. In the case of this preferred embodiment, the attachment portions 4a of the insertion part 4 are attached to the diffuser 12. This attachment is carried out by use of fold-back portions 4c at the outer ends of the attachment portions 4a which will be folded back into the interior of diffuser 12 when the folded area is pressed by caps 14, 15 that serve as pressing members. This folded condition is shown in FIG. 1.

The insertion part 4 has a bottom part that includes a plurality of spaced apart through holes 4d for allowing rivets 17 to pass through. The rivets 17 are for mounting the diffuser 12 together with the case 20 on a bracket 23 extending from a frame of a car door.

Figure 3A:
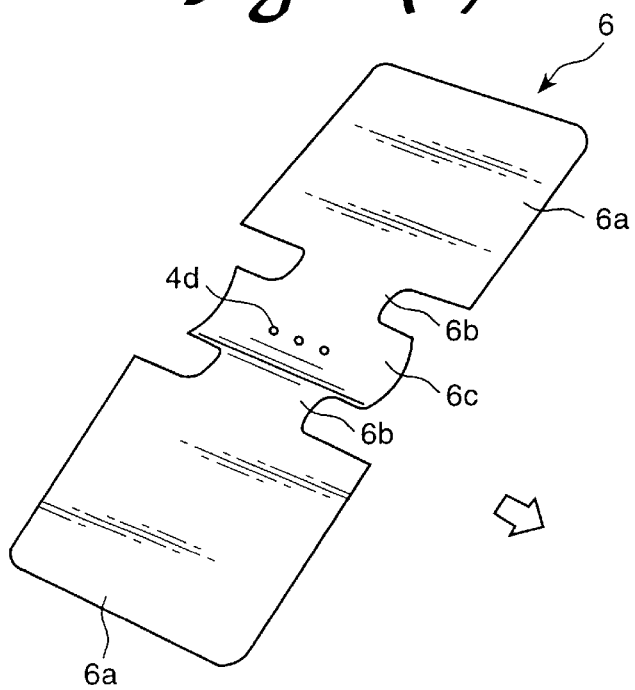
FIGS. 3a–3c are views illustrating a process for manufacturing the air bag of the first preferred embodiment.
Figure 3B:
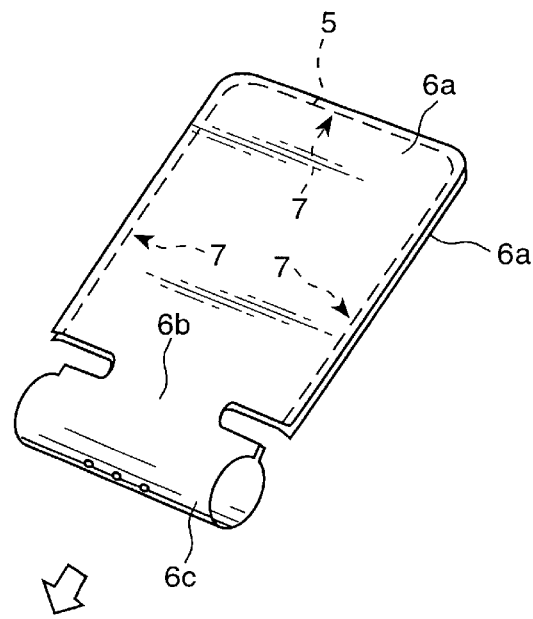
Figure 3C:
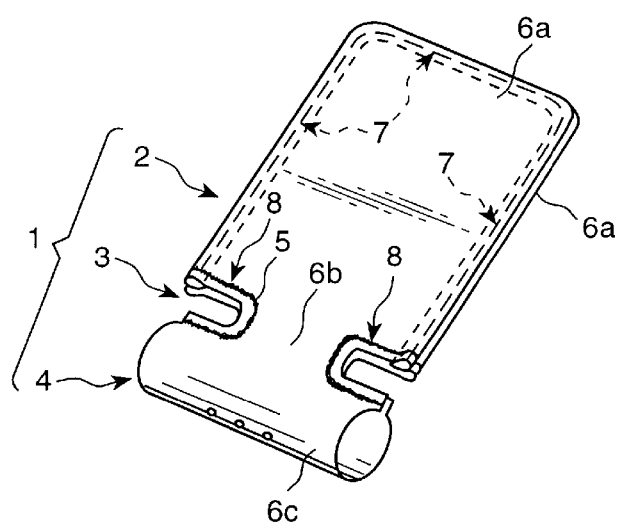

Air bag 1 as shown in FIGS. 3a–3c is made of a single base cloth 6 preferably comprising a fabric made of polyester, polyamide or similar material, which is coated, as necessary, with a heat-resistant coating.

The base cloth 6, as shown in FIGS. 3a–3c, is made up of two main body part areas 6a, one insertion part area 6c and two connecting part areas 6b. The main body part areas 6a, 6a are at the ends of the base cloth 6 and are uniformly wide and wider than the insertion part area 6c. The insertion part area 6c is located approximately in the middle of the base cloth 6 and includes the plurality of through holes 4d. The connecting part areas 6b, 6b lie between the main body part areas 6a and the insertion part area 6c and are narrow so as to be constricted.

The air bag 1 can be manufactured from this base cloth 6 in the following way. First, in such a way that surfaces which are to be on the outside of the air bag 1 are brought into contact with each other the main body part areas 6a are aligned with each other face to face and their left, right and upper edges are stitched together. The stitching thread 5 used is preferably made of polyester, polyamide or threads of similar strength. The stitching of the stitching thread 5 in this area is in the form of chain stitching or double stitching with, for example, an upper thread having a 1250 denier and a lower thread with an 850 denier. A suitable range of deniers for both threads is from about 700 to about 1500 denier. The work is then turned inside out and the edges of the doubled connecting part areas 6b, of the insertion part area 6c and of the lower edges of the main body part areas 6a are lock stitched together with stitching thread 5. By these steps it is possible to manufacture the air bag 1.

The lock stitching of the stitching thread 5 is so carried out that the end openings 4b are not closed. Reference numeral 7 denotes areas of chain stitching while reference numeral 8 denotes areas of lock stitching. Where lock stitching is used, the thread used on both the upper and lower thread can have, for example, a 1700 denier. A suitable range of denier is from about 1200 to about 2000.

Figure 4A:
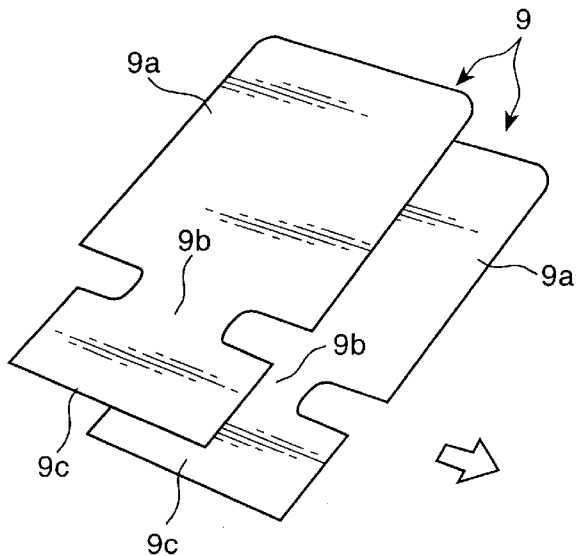
FIGS. 4a–4c are views illustrating another process for manufacturing the air bag of the first preferred embodiment.
Figure 4B:
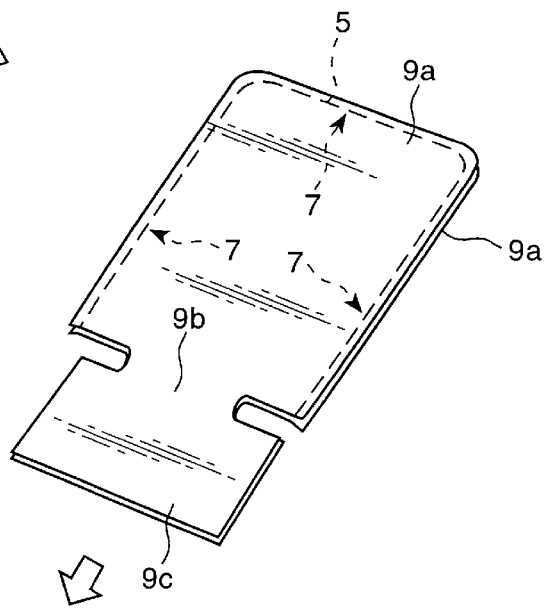
Figure 4C:
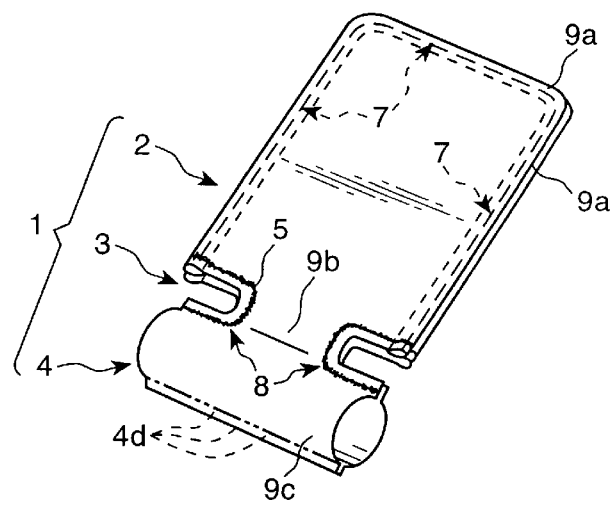

Air bag 1 can also be manufactured from two individual base cloths 9 of the kind shown in FIGS. 4a–4c. Each base cloth 9, as shown in FIGS. 4a–4c, is made up of a main body part area 9a, for forming the main body part 2 of the air bag 1, a constricted connecting part area 9b and an insertion part area 9c.

To manufacture the air bag 1 from these individual base cloths 9, first, the individual base cloths 9 are positioned in such a way that surfaces which are to be on the outside of the air bag 1 are brought into direct contact with each other. The main body part areas 9a are aligned with each other face to face and with their left, right and upper edges then being chain stitched together with stitching thread 5. After that, the partially stitched bag is turned inside out. Then, the edges of the doubled connecting part areas 9b, the insertion part areas 9c and the lower edges of the main body part areas 9a are lock stitched in such a way that the openings 4b are not closed. By these steps it is possible to manufacture the air bag from the two base cloths 9. The through holes 4d are not stitched and remain open.

The inflator 11 is made up of a main body part 11a, a flange part 11c and a threaded part 11d. The main body part 11a is cylindrical and has a discharge opening 11b for discharging gas for expanding the air bag 1. The flange part 11c is disposed at one end of the main body part 11a. The threaded part 11d is disposed at the other end of the main body part 11a.

The diffuser 12 is, for example, a cylindrical pipe, such as a steel pipe although other strong material can be used. The diffuser 12 has multiple gas delivery holes 12a passing through its circumferential wall from inside to outside.

Also, the diffuser 12 has mounting holes 12b, as in FIG. 1, for the rivets 17 to pass through in positions approximately opposite the multiple gas delivery holes 12a.

In the case of this first preferred embodiment, the air bag 1 is attached to diffuser 12 using the end caps 14 and 15 that serve as pressing members. Also, the air bag 1 is attached to case 20 using the diffuser 12 and where desired bracket 23.

Cap 14 is disposed at the flange part 11c end of the inflator 11. Cap 14 comprises cylinder portion 14a and a flange portion 14b. The cylinder portion 14a of the cap 14 receives the main body part 11a of the inflator which can pass therethrough and is also insertable into the inside of diffuser 12. An end flange 14c will abut an end of diffuser 12. The flange portion 14b of the cap 14 is located at the end of the cylinder portion 14a and flange 14d abuts an outer end surface of the flange 14c.

The cap 15 is disposed at the threaded part 11d of inflator 11. Cap 15 is made up of a cylinder portion 15a and a flange portion 15c. The cylinder portion 15a is insertable into the inside of the diffuser 12 and has a through hole 15b through which the threaded part 11d can be passed and through which the main body part 11 a cannot pass. The flange portion 15c is formed on the end of the cylinder portion 15a and abuts the opposite end surface of diffuser 12.

The case 20 is made of sheet metal and includes a large volume chamber 20a and a small volume chamber 20e. The large volume chamber 20a is in an upper part of the case 20 and is shaped like a rectangular parallelopiped. The small volume chamber 20e is in a lower part of the case 20 and has a roughly cylindrical shape. The large volume chamber 20a contains the folded air bag main body part 2. The small volume chamber 20e contains the inflator 11 and the diffuser 12.

The peripheral wall of the large volume chamber 20a above the small volume chamber 20c has a plurality of engaging claws 20b and a plurality of engaging holes 20c. The engaging claws 20b and the engaging holes 20c are for mounting the cover 21 which covers the opening 20d of the large volume chamber 20a. Also, the small volume chamber 20e has insertion holes 20f, 20f in each of its left and right side faces. The inflator 11 and the diffuser 12 are inserted through these insertion holes 20f. The bottom face of the small volume chamber 20e has a plurality of through holes 20g. The rivets 17 pass through these through holes 20g.

The cover 21 is made up of a main body part 21a, a mounting arm part 21b and engaging legs 21e. The main body part 21a is a rectangular plate and covers the opening 20d of the case 20. The main body part 21a is disposed as part of an interior trim member 25 of a car door and covers the opening 25a of the member 25. The mounting arm part 21b is disposed along one side of the main body part 21a. The engaging legs 21e are disposed on the other side of the main body part 21a. The mounting arm part 21b has four sets of engaging holes 21c, 21d. The engaging claws 20b of the case 20 are inserted into and engage with the edges of these engaging holes 21c, 21d. The cover 21 is attached to the case 20 by the engaging claws 20b being engaged with the edges of the sets of engaging holes 21c, 21d. By the engaging legs 21e being inserted into and engaged with the edges of the engaging holes 20c, the cover 21 is mounted on the case 20 so that it covers the opening 20d. When the air bag expands, the engagement of the engaging legs 21e with the edges of the engaging holes 20c is released as the cover 21 is pushed by the main body part 2 of the air bag 1. As a result, opening 20d of the case 20 is developed.

The assembly of the air bag device M1 of this preferred embodiment will now be described. First, the diffuser 12 is inserted into the insertion part 4 of the air bag 1. Then, the fold-back portions 4c at the outer ends of the attachment portions 4a are folded back against the inner circumferential surface of the diffuser 12. Then, the portions 14a and 14b of the cap 14 are fitted into place at one end of the diffuser 12 and the inflator 11 is inserted into the diffuser 12. Also, the cap 15 is fastened onto the threaded part 11d with a nut 13. When this is done, the attachment portions 4a, 4a of the air bag 1 are pressed upon by the caps 14, 15 and the air bag 1 is thereby attached to the diffuser 12.

The main body part 2 of the air bag 1 is then folded. After that, the air bag 1, the inflator 11 and the diffuser 12 are fitted inside the case 20. Then, the rivets 17 passing through the mounting holes 12b and the through holes 4d, 20g are fastened to the bracket 23. When this is done, the air bag 1, the inflator 11 and the diffuser 12 are fixed to the case 20 and the whole air bag device M1 is mounted on the bracket 23.

After that, if under predetermined circumstances gas is discharged through the gas discharge opening 11b of the inflator 11, the main body part 2 of the air bag 1 opens the cover 21 and greatly expands outwardly through opening 20d.

At this time, because in the areas of stitching 8 in the vicinity of the inflator 11 the lower edges of the main body part areas 6a and the edges of the connecting part areas 6b and the insertion part area 6c of the base cloth 6 are stitched with non-extendable lock stitching, the stitched together lower edges of the main body part areas 6a and edges of the connecting part areas 6b and the insertion part area 6c do not part. Consequently, the stitching thread 5 of the areas of stitching 8 in the vicinity of the inflator 11 does not readily come into contact with the gas. As a result, it is possible to eliminate damage caused by the gas suffered by the stitching thread 5 in the vicinity of the inflator 11.

Also, in the areas of stitching 7 distant from the inflator 11, the main body part areas 6a of the base cloth 6 are stitched together with extendable chain stitching. Consequently, large tensile forces acting on the base cloth 6 when the air bag main body part 2 finishes expanding are moderated.

Therefore, in the air bag 1 of this first preferred embodiment, even if the output of the inflator 11 is high, it is possible to prevent gas leakage in areas in the vicinity of the inflator 11. Also, even if the output of the inflator 11 is high, it is possible to eliminate damage suffered by stitching thread in areas in the vicinity of the inflator 11. Also, large tensile forces acting on the base cloth 6 when the air bag finishes expanding are moderated.

Furthermore, in the air bag 1 of this first preferred embodiment, the operation of fitting the air bag 1 is easy and the assembly of the air bag device M1 is improved. That is, when attaching the air bag 1 to the diffuser 12, the cylindrical diffuser 12 is inserted into the insertion part 4 and the attachment portions 4a at the ends of the insertion part 4 are fixed to the diffuser 12 using the caps 14, 15. At that time, because of the constriction of the connecting part 3, the attachment portions 4a at the ends of the insertion part 4 can be easily seen from outside. Consequently, positioning of the diffuser 12 and fitting of the caps 14, 15 serving as pressing members is carried out easily.

In this first preferred embodiment, the outer ends of the attachment portions 4a of the insertion part 4 of the air bag 1 are folded against the inner circumferential surface of the diffuser 12 and press-fixed to the diffuser 12 with the caps 14, 15.

However, if the length of the inflator 11 is short, the flange part 11c of the inflator 11 and a nut 13 of increased external diameter can be used as the pressing members instead of using the caps 14, 15. In this case, the air bag 1 can be attached to the diffuser 12 by directly clamping the fold back portions 4c of the insertion part 4 with the flange part 11c and the nut 13.

Alternatively, the inflator 11 and the diffuser 12 are made long and the air bag 1 is attached to the diffuser 12 by the attachment portions 4a of the insertion part 4 being pressed against the outer circumferential surface of the diffuser 12 using clamps. In this case, the attachment portions 4a are not folded back.

Figure 5:
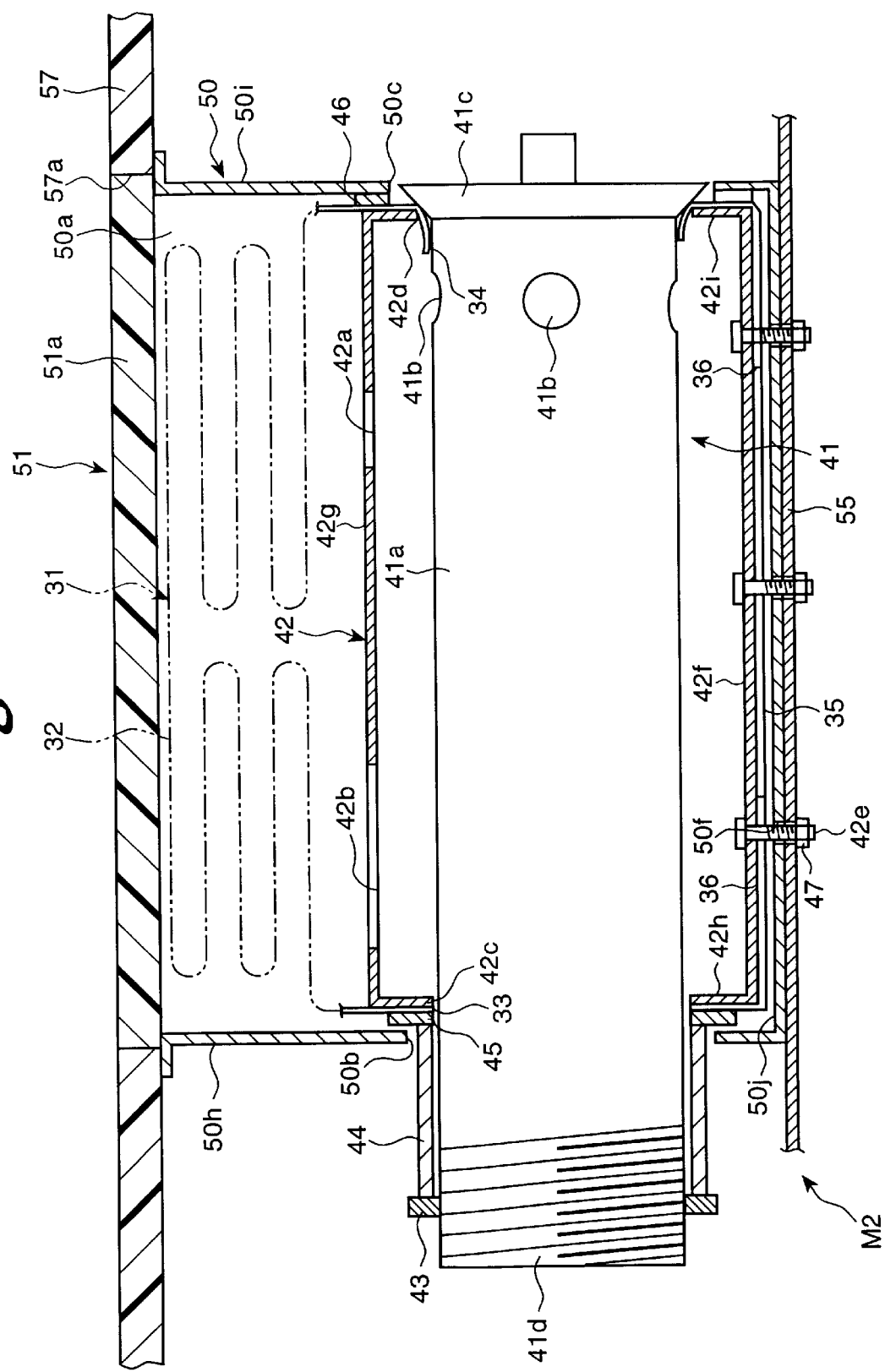
FIG. 5 is a sectional view of an air bag device in which an air bag of a second preferred embodiment of the invention is used.
Figure 6:
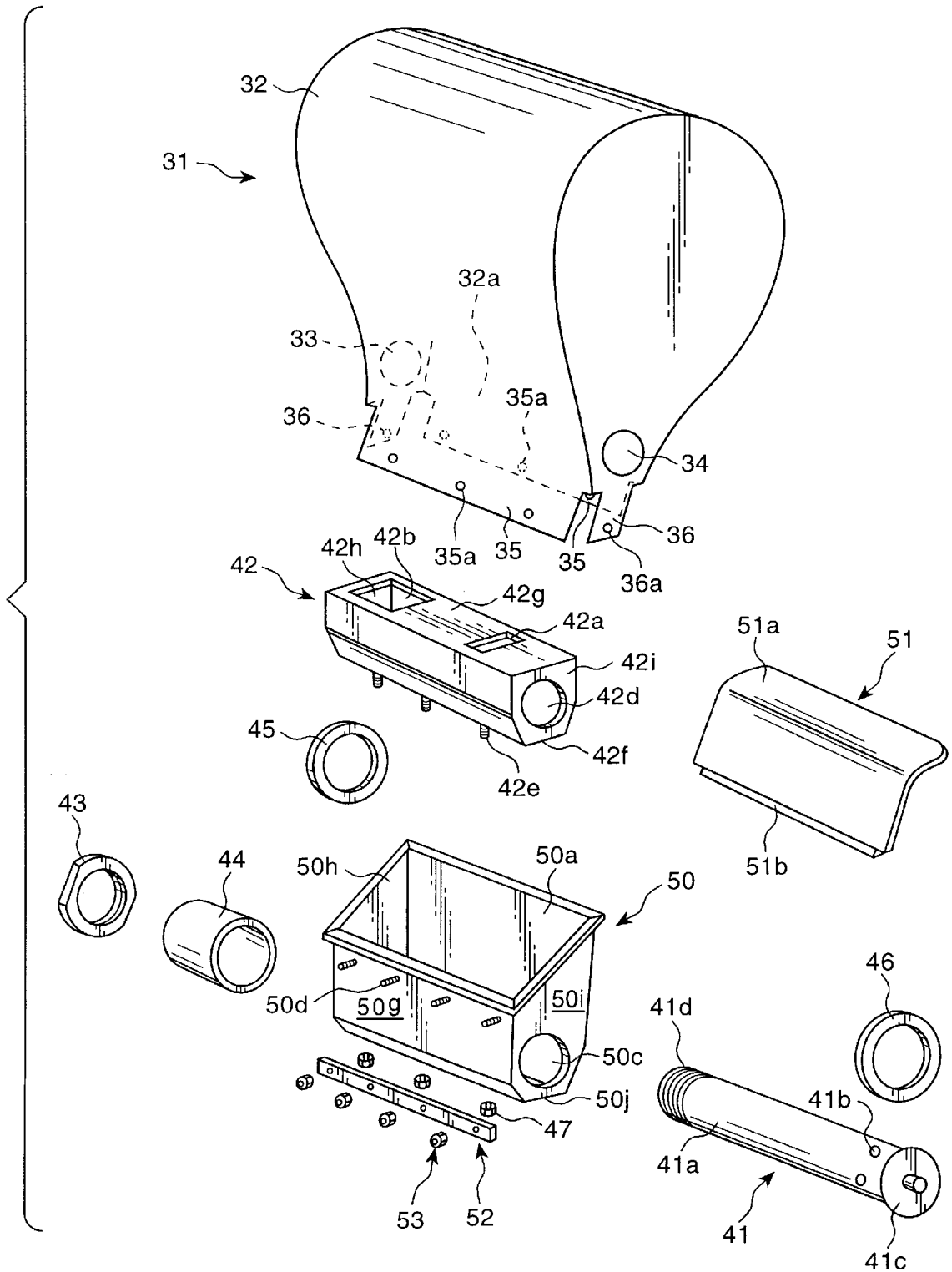
FIG. 6 is an exploded perspective view of the second preferred air bag device.

An air bag 31 of a second preferred embodiment of the invention shown in FIGS. 5 and 6 is one used in an air bag device M2 installed in an instrument panel 57 adjacent the front of a passenger seat of a car. This air bag device M2 is comprised of an air bag 31, an inflator 41, a diffuser 42, a case 50 and a cover 51. The inflator 41 is of the cylinder type and supplies gas for expansion to air bag 31. The diffuser 42 is shaped substantially like a rectangular parallelopiped. The case 50 is also shaped substantially like a rectangular parallelopiped and contains the folded air bag 31, the inflator 41 and the diffuser 42. Cover 51 covers an opening 50a of the case 50.

Air bag 31 is shaped substantially like a rectangular tube and is made up of a baglike main body part 32 and four attachment flaps 35, 35, 36, 36 provided at the inner end or bottom of the main body part 32. The two attachment flaps 35, 35 face each other at two opposing sides while the two attachment flaps 36, 36 face each other at two opposing ends.

The main body part 32 has through holes 33, 34 in predetermined positions. The inflator 41 is inserted through the through holes 33, 34.

The attachment flaps 35, 36 are provided at the bottom of the main body part 32 and are arranged around the edge of a rectangular opening 32a. The attachment flaps 35, 36 are bent against a bottom wall 42f of diffuser 42. Bolts 42e projecting from the bottom wall 42f, pass through attachment holes 35a, 36a formed in the attachment flaps 35, 36. Also, the bolts 42e are passed through attachment holes 50f in the case 50 and through a bracket 55 extending from a frame of a car. Bolts 42e then being fastened with nuts 47, and thus, the air bag 31 can be fixed to the case 50. Also, by screwing the nuts 47 onto the bolts 42e, the whole air bag device M2, including case 50, can be mounted on the instrument panel 57.

Figure 7A:
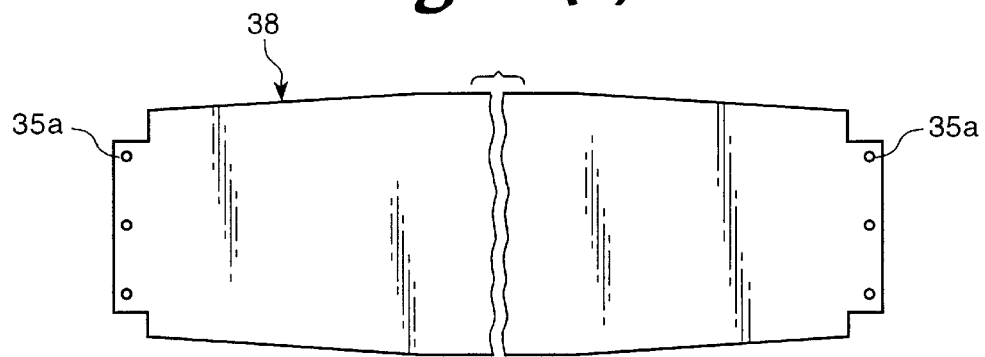
FIGS. 7a–7c are views illustrating a process for manufacturing the air bag of the second preferred embodiment.
Figure 7B:
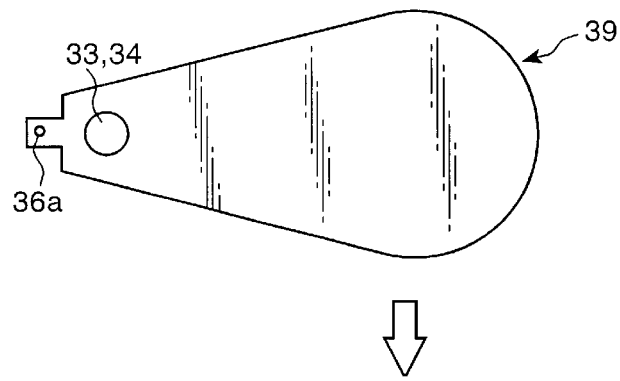
Figure 7C:
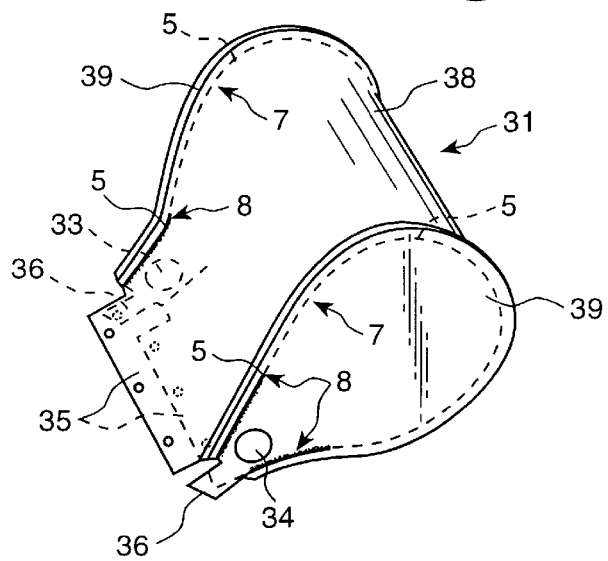
Figure 8:
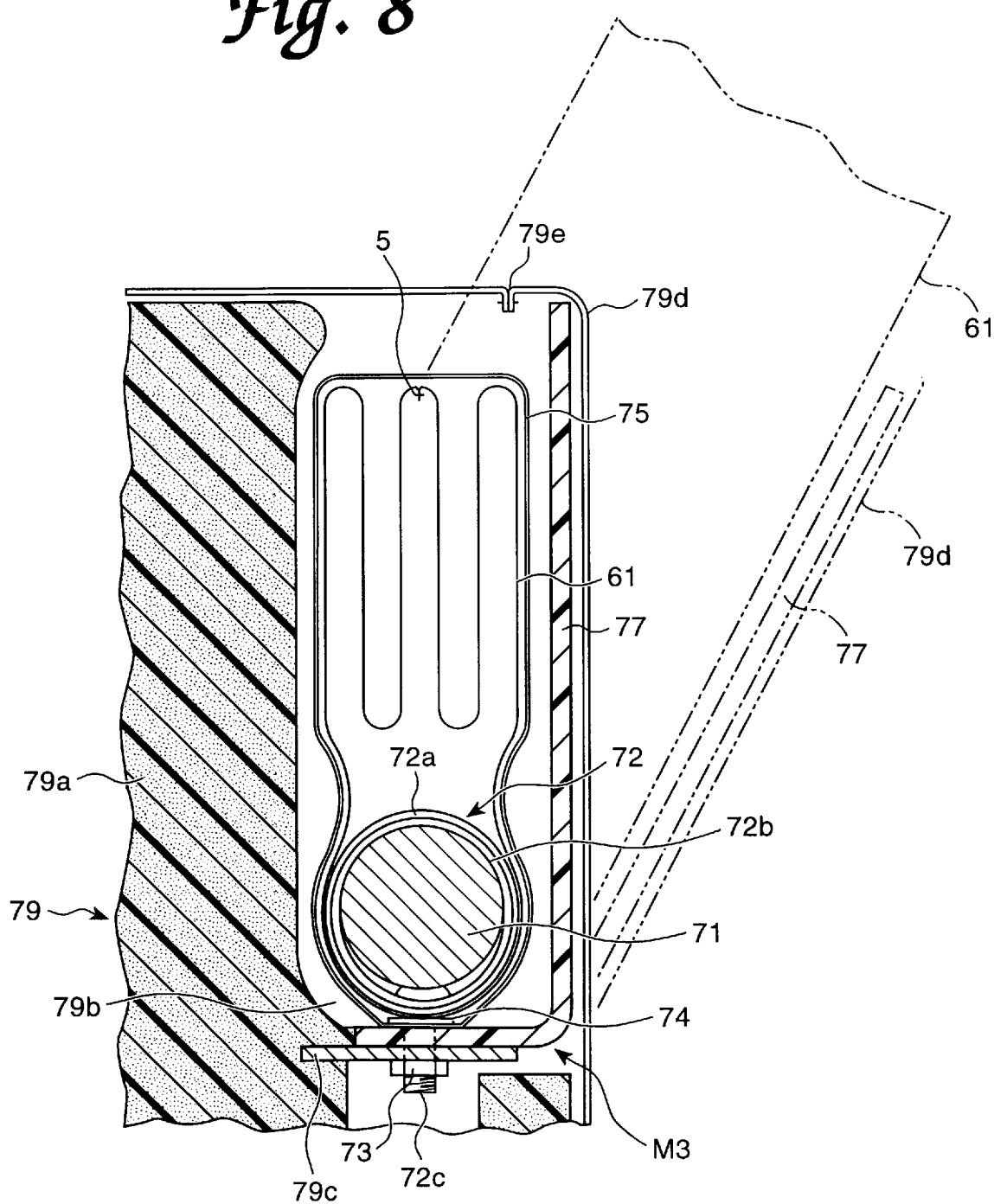
FIG. 8 is a sectional view of an air bag device in which an air bag of a third preferred embodiment of the invention is used.

Air bag 31, as shown in FIGS. 7a–7c, is manufactured by stitching together one base cloth 38 and two base cloths 39. The base cloths 38, 39 are made from the same material as the base cloth 6 of the first preferred embodiment. The base cloths 39 are each smaller than the base cloth 38 and each constitutes one of the facing attachment flaps 36 and a side face of the main body part 32. Also, each of the base cloths 39 have the through holes 33, 34 in the vicinity of attachment flaps 36. The base cloth 38 is larger than the base cloths 39 and constitutes the two facing attachment flaps 35 and the remainder of the main body part 32.

To manufacture air bag 31, as shown in FIGS. 7a–7c, the base cloths 39 are first stitched onto the side edges of the base cloth 38 with stitching thread 5. At this time, the vicinity of the attachment flaps 35, 36 is stitched using lock stitching 8, and areas distant from the attachment flaps 35, 36 are stitched using chain stitching 7. After such stitching is completed, the work is turned inside out and an air bag 31 is thereby obtained.

The inflator 41 has a cylindrical main body part 41a having gas discharge openings 41b. A flange part 41c and a threaded part 41d are disposed at opposite ends of the main body part 41a.

The diffuser 42 is shaped substantially like a rectangular parallelopiped and is made of sheet metal. An upper wall 42g of the diffuser 42 has gas delivery holes 42a, 42b. Two opposite side walls 42h and 42i of the diffuser 42 have insertion holes 42c, 42d, respectively, for the inflator 41 to be inserted through. The above-mentioned bolts 42e are provided projecting from the bottom wall 42f of the diffuser 42.

The case 50 is made of sheet metal and is shaped like a box having the opening 50a at the top. Two opposite side walls 50h and 50i of the case 50 have insertion holes 50b, 50c, respectively, for the inflator 41 to be inserted through. Bolts 50d for mounting the cover 51 are provided on another side wall 50g. The bottom wall 50j of the case 50 has attachment holes 50f for the bolts 42e of the diffuser 42 to pass through.

Figure 6A:
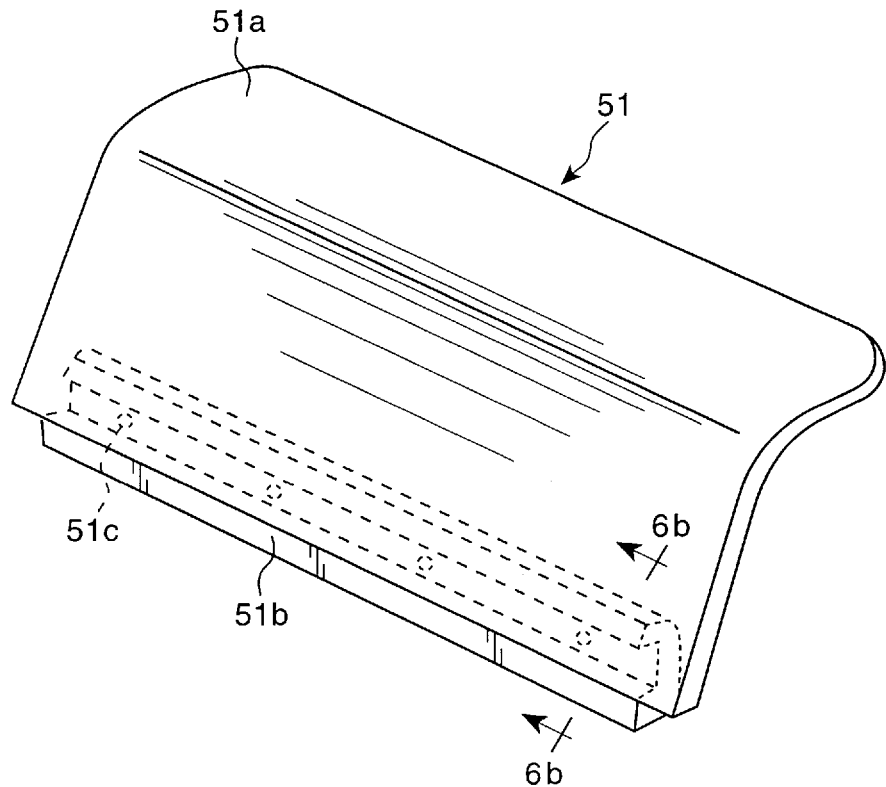
FIG. 6a is an enlarged view of a cover.
Figure 6B:
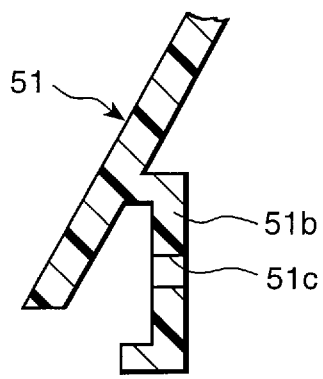

The cover 51, shown in FIGS. 6a–6b, is made of synthetic resin and has a main body 51a and a mounting arm part 51b. The main body 51a is of rectangular plate form and covers the opening 50a of the case 50. The main body 51a can be fitted in an opening 57a in the instrument panel 57. The mounting arm part 51b has mounting holes 51c for the bolts 50d to pass through. The cover 51 is mounted on the case 50 in the following way. First, the bolts 50d are passed through the mounting holes in the mounting arm part 51b of the cover 51. The cover 51 is then fixed to the case 50 by nuts 53 being screwed onto the bolts 50d with a washer plate 52 being interposed between the mounting arm part 51b and the nuts 53.

Assembly of the air bag device M2 of this second preferred embodiment will now be described. First, the diffuser 42 is fitted inside the air bag 31 through opening 32a. Then, attachment flaps 35, 36 are bent so that the bolts 42e pass through the attachment holes 35a, 36a. After that, the air bag 31 is itself folded.

Then, the air bag 31 and the diffuser 42 are fit into case 50 so that the bolts 42e pass through the above-mentioned attachment holes 50f in the bottom wall 50j of case 50. Steel spacers 45, 46 are placed on the inner sides of the through holes 33, 34.

The cover 51 is then mounted on the case 50 using the bolts 50d, the washer plate 52 and the nuts 53.

Then, the inflator 41 is inserted from the threaded part 41d end thereof into the case 50 through the insertion hole 50c. The threaded part 41d is passed through the spacer 46, the insertion hole 34 in the air bag 31, the insertion hole 42d and the insertion hole 42c in the diffuser 42, the insertion hole 33 in the air bag 31 and the spacer 45 and is protruded through the insertion hole 50b in the case 50.

After that, a steel spacer 44 is fitted onto the threaded part 41d and a nut 43 is screwed onto the threaded part 41d. At this time, the diffuser 42 is clamped by the nut 43 and the flange part 41c of the inflator 41 by way of the spacers 44, 45 and 46. As a result, the inflator 41 is connected to the diffuser 42 together with the air bag 31.

The cover 51 is then fit in opening 57a of the instrument panel 57. Also, by fastening bolts 42e with nuts 47 to the bracket 55 extending from the above-mentioned frame of the car, the air bag device M2 can be installed in a predetermined position in the instrument panel 57.

If under predetermined circumstances gas is discharged through the gas discharge openings 41b in the inflator 41, this gas passes through the gas delivery holes 42a, 42b in the diffuser 42 and flows into the main body part 32 of the air bag 31. The main body part 32 then pushes cover 51 open and expands to a large volume.

At this time, even if the output of the inflator 41 is high, because in the areas of stitching 8 in the vicinity of the inflator 41 the base cloths 38, 39 are stitched together non-extendably, the base cloths 39 in the vicinity of the inflator 41 do not part. Consequently, gas leakage is prevented. Also, the stitching thread 5 of the areas of stitching 8 in the vicinity of the inflator 41 does not readily come into contact with the gas and damage caused by gas suffered by the stitching thread 5 in the vicinity of the inflator 41 is eliminated.

Also, in the areas of stitching 7 distant from the inflator 41, the base cloths 38, 39 are stitched together extendably. Consequently, large tensile forces acting on the base cloths 38, 39 when the air bag 31 finishes expanding are moderated.

An air bag 61 of a third preferred embodiment of the invention is shown in FIGS. 8 and 9a–9c and is used in an air bag device M3 installed in a seat 79. The air bag device M3 comprises the air bag 61, an inflator 71 and a cover 77.

The air bag device M3 is installed in a recess 79b provided in a backrest part 79a of the seat 79. When it operates, this air bag device M3 deploys the expanded air bag 61 (shown in phantom) between the backrest part 79a of the seat 79 and a door or wall part of a vehicle interior.

Figure 9A:
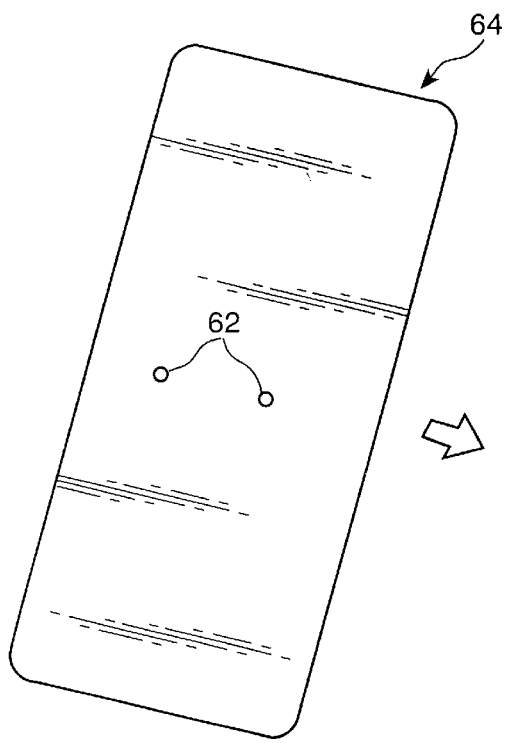
FIGS. 9a–9c are views illustrating a process for manufacturing the air bag of the third preferred embodiment.
Figure 9B:
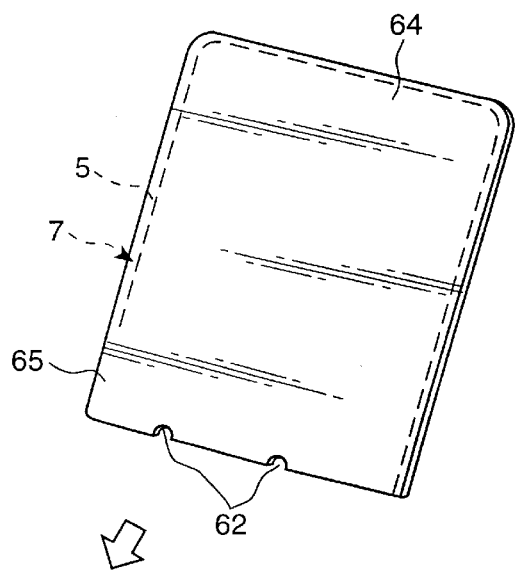
Figure 9C:
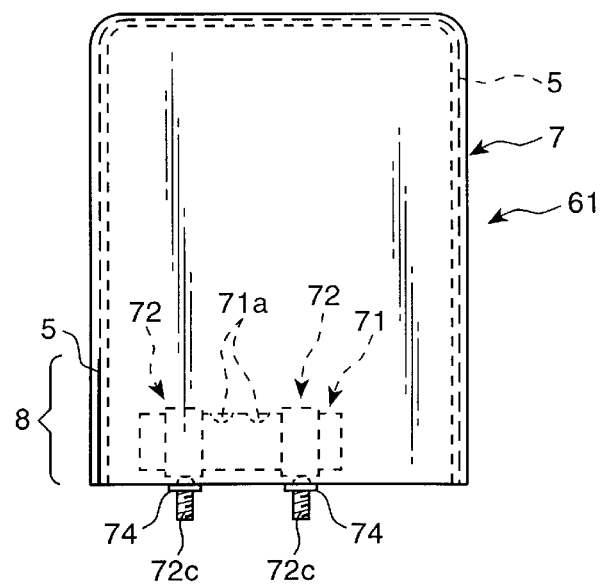

The inflator 71 is preferably of a cylinder type and has gas discharge openings 71a shown in FIGS. 9a–9c. The inflator 71 is mounted on a frame 79c of the seat 79 using two mounting brackets 72.

Each of the mounting brackets 72 has a tubular main body 72a, for example, made of sheet metal. A cushion member 72b is affixed to an inner surface of the main body 72a. Also, two bolts 72c are fixed to the main bodies 72a. The mounting brackets 72 are attached to the inflator 71 in the following way. First, the main bodies 72a are fitted onto the inflator 71. Then, the main bodies 72a are plastically deformed so that their internal diameters decrease. As a result, the mounting brackets 72 are fixed to the inflator 71. The cover 77 is L-shaped in cross-section and is made of synthetic resin. The cover 77 is attached to the frame 79c of the seat 79 using the bolts 72c of the mounting brackets 72 and nuts 73. The cover 77 covers the folded air bag 61. When the air bag 61 expands, the cover 77 is pushed open by the air bag 61.

The air bag 61 is shaped like a rectangular bag and has, in predetermined positions, two insertion holes 62 for the bolts 72c of the mounting brackets 72 to pass through.

As shown in FIGS. 9a–9c, a base cloth 64, from which the air bag 61 is manufactured, is shaped like a rectangular sheet. The base cloth 64 is made of the same material as the base cloth 6. The air bag 61 is manufactured in the following way. First, the insertion holes 62, 62 are provided in the base cloth 64. Then, the air bag 61 is folded so that those surfaces to be on the outside of the air bag 61 are brought into contact with each other in a face to face manner. Then, excluding parts of the edge in the vicinity of the fold line, the remaining edges of the two doubled halves are chain stitched together. Then, using the opening 65 formed at the edge part which was not stitched, the work is turned inside out. After that, the opening 65 is closed by lock stitching with stitching thread 5 to obtain an air bag 61.

Before the air bag 61 is closed, the inflator 71 fitted with the mounting brackets 72, 72 is inserted. Also, the bolts 72c of the mounting brackets 72 protrude through the insertion holes 62 and spring washers 74 are fitted onto them. The spring washers 74 are used to press upon the insertion holes 62 and prevent the bolts 72c from coming out of the insertion holes 62.

After the air bag 61 is thus manufactured, the air bag 61 is folded. The air bag 61 is then covered by means of a film 75, for example, a thermally contracting film or the like. The film 75 is used to prevent the air bag 61 from unfolding. The film 75 will break easily when the air bag 61 expands.

After the air bag 61 is covered with film 75, using the bolts 72c, 72c and the nuts 73, 73, the inflator 71, the air bag 61 and the cover 77 are attached to the frame 79c of the seat 79. Then, a covering material 79d is stitched over seat 79 and the seat 79 is installed in the vehicle. As a result, the air bag device M3 is installed in the vehicle. The stitched seam 79e of the covering material 79d is so stitched that when the air bag 61 expands and pushes on it the stitching easily breaks.

If under predetermined circumstances gas is discharged through the gas discharge openings 71a of the inflator 71, the air bag 61 breaks the film 75, opens the cover 77, breaks the stitched seam 79e and expands to a large volume.

At this time, even if the output of the inflator 71 is high, because in the area of stitching 8 in the vicinity of the inflator 71 the base cloth 64 is stitched non-extendably, the portions of base cloth 64 stitched together in the vicinity of the inflator 71 do not part. Consequently, gas leakage is prevented. Also, the stitching thread 5 of the area of stitching 8 in the vicinity of the inflator 71 does not readily come into contact with the gas, and damage caused by gas suffered by the stitching thread 5 in the vicinity of the inflator 71 is eliminated.

In the area of stitching 7 distant from the inflator 71, the base cloth 64 is stitched extendably. Consequently, large tensile forces acting on the base cloth 64 when the air bag 61 finishes expanding are moderated.

To increase the durability of the air bags 1, 31, 61 of the preferred embodiments described above with respect to high temperature, high pressure gas from the inflators 11, 41, 71, when necessary, reinforcing cloths made of the same material as the base cloth can be provided. In this case, when reinforcing cloths are stitched together to form the shape of an air bag, non-extendable stitching such as lock stitching should be used. Of course, if a reinforcing cloth is provided distant from the inflator, extendable stitching such as chain stitching can be used.

Also, in the preferred embodiments described above, as the air bags 1, 31, 61 of the air bag devices M1, M2 and M3, air bags for installation in a door, an instrument panel or a seat of a car were presented as examples; however, the invention can also be applied to air bags installed in other locations such as in a steering wheel of a car.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air bag of an air bag device, said air bag being capable of being coupled to an inflator and expanded when gas is supplied thereto by said inflator, said air bag comprising;

a base cloth formed by stitching a plurality of portions of said base cloth together to thereby form said base cloth into the shape of a bag, wherein said stitching includes both non-extendable stitching and extendable stitching, the stitching employed on portions of said base cloth adjacent to where said inflator can be coupled to said air bag comprises a non-extendable stitching, and the stitching elsewhere on said base cloth comprises an extendable stitching.

2. An air bag according to claim 1, wherein said air bag comprises:

a greatly expandable main body part;

a connecting part provided at an end of said main body part; and a substantially cylindrical insertion part connected to said connecting part and having ends open so as to be capable of inserting said inflator therein;

wherein said connecting part is formed so as to be constricted from said ends of said insertion part and stitching of portions of said base cloth forming said main body part, said insertion part and said connecting part which is capable of being arranged in the vicinity of said inflator is non-extendable stitching and stitching in an area of said main body part which is capable of being arranged distant from said inflator is extendable stitching.

3. An air bag according to claim 1, wherein said air bag further comprises:

a main body part shaped substantially like a rectangular tube; and two pairs of mutually facing attachment flaps provided at an end of the main body part;

wherein said base cloth includes two small base cloth portions and a large base cloth portion;

said two small base cloth portions constitute one of said two pairs of mutually facing attachment flaps and side faces of said main body part, and have in the vicinity of each of their attachment flaps a through hole through which said inflator is capable of being inserted; and said large base cloth portion constitutes the other of said two pairs of mutually facing attachment flaps and the remainder of said main body part; and said small base cloth portions are each attached by said stitching to a side edge of said large base cloth portion and the stitching is non-extendable stitching in an area in the vicinity of the attachment flaps and is extendable stitching in an area distant from the attachment flaps.

4. An air bag according to claim 1, wherein said base cloth of said air bag further comprises:

a substantially rectangular, folded base cloth having doubled edges which are joined together by said stitching, wherein the stitching is non-extendable stitching in an area which is capable of being arranged in the vicinity of said inflator and is extendable stitching in an area which is capable of being arranged distant from said inflator.

5. An air bag device comprising:

an inflator;

an air bag, said air bag being coupled to said inflator and being expandable by gas supplied from said inflator, said air bag comprising:

a base cloth formed by stitching a plurality of portions of said base cloth together to thereby form said base cloth into the shape of a bag, wherein said stitching includes both non-extendable stitching and extendable stitching, the stitching employed on portions of said base cloth adjacent to said inflator is non-extendable stitching, and the stitching elsewhere on said base cloth is extendable stitching.

6. An air bag device according to claim 5, further comprising:

pressing members; and a cylindrical diffuser;

wherein said inflator is a cylindrical inflator which is covered by said cylindrical diffuser; and said air bag comprises:

a greatly expandable main body part;

a connecting part provided at an end of said main body part;

a substantially cylindrical insertion part connected to said connecting part and having ends open for inserting said diffuser covering said inflator and having said ends attached using said pressing members to said diffuser; and said connecting part is formed so as to be constricted from said ends of said insertion part and stitching of portions of said base cloth forming said main body part, said insertion part and said connecting part in the vicinity of said inflator is non-extendable stitching and said stitching in an area of said main body part distant from said inflator is extendable stitching.

7. An air bag device according to claim 5, said air bag of said air bag device comprising:

a main body part shaped substantially like a rectangular tube; and two pairs of mutually facing attachment flaps provided at an end of said main body part; and wherein said base cloth includes two small base cloth portions and a large base cloth portion;

said two small base cloth portions constitute one of two pairs of mutually facing attachment flaps and side faces of said main body part, and have in the vicinity of each of their attachment flaps a through hole through which said inflator is inserted;

said large base cloth portion constitutes the other of said two pairs of mutually facing attachment flaps and the remainder of said main body part; and said small base cloth portions are each attached by said stitching to a side edge of said large base cloth portion and the stitching is non-extendable stitching in an area in the vicinity of the attachment flaps and is extendable stitching in an area distant from the attachment flaps.

8. An air bag device according to claim 5, said base cloth of said air bag comprising:

a substantially rectangular, folded base cloth having doubled edges joined together by said stitching;

wherein the stitching is non-extendable stitching in an area in the vicinity of said inflator and is extendable stitching in an area distant from said inflator.

9. An air bag of an air bag device, said air bag being capable of being coupled to an inflator and extended when gas is supplied thereto by said inflator, said air bag comprising:

a base cloth formed by stitching into the shape of a bag;

wherein the stitching employed adjacent to where said inflator can be coupled to said air bag comprises non-extendable stitching, and the stitching elsewhere on said base cloth is an extendable stitching; and said air bag further comprises a main body part shaped substantially like a rectangular tube and two pairs of mutually facing attachment flaps provided at an end of said main body part;

said base cloth includes two small base cloth portions and a large base cloth portion;

said two small base cloth portions constitute one of said two pairs of mutually facing attachment flaps and side faces of said main body part, and have in the vicinity of each of their attachment flaps a through hole through which said inflator is capable of being inserted;

said large base cloth portion constitutes the other of said two pairs of mutually facing attachment flaps and the remainder of said main body part; and said small base cloth portions are each attached by said stitching to a side edge of said large base cloth portion and the stitching is non-extendable stitching in an area in the vicinity of the attachment flaps and is extendable stitching in an area distant from the attachment flaps.

* * * * *